United States Patent [19]
Ball et al.

[11] Patent Number: 5,795,076
[45] Date of Patent: Aug. 18, 1998

[54] TILT PAD HYDRODYNAMIC BEARING FOR ROTATING MACHINERY

[75] Inventors: James H. Ball, New Berlin; Thomas R. Byrne, Port Washington, both of Wis.

[73] Assignee: Orion Corporation, Grafton, Wis.

[21] Appl. No.: 848,986

[22] Filed: Apr. 30, 1997

Related U.S. Application Data

[63] Continuation of Ser. No. 542,521, Oct. 13, 1995, abandoned.

[51] Int. Cl.$^6$ .................................................. F16C 17/06
[52] U.S. Cl. .......................................... 384/307; 384/122
[58] Field of Search .............................. 384/122, 368, 384/307, 308, 306

[56] References Cited

U.S. PATENT DOCUMENTS

| | | |
|---|---|---|
| 2,507,021 | 5/1950 | Lakey . |
| 3,814,487 | 6/1974 | Gardner . |
| 3,829,180 | 8/1974 | Gardner . |
| 4,026,613 | 5/1977 | Moravchik . |
| 4,055,107 | 10/1977 | Bartley . |
| 4,077,682 | 3/1978 | Gardner . |
| 4,240,676 | 12/1980 | Anderson et al. . |
| 4,402,514 | 9/1983 | Ryan et al. . |
| 4,403,873 | 9/1983 | Gardner . |
| 4,413,829 | 11/1983 | Pietsch . |
| 4,421,425 | 12/1983 | Foucher et al. . |
| 4,501,505 | 2/1985 | Chambers . |
| 4,568,204 | 2/1986 | Chambers . |
| 4,714,357 | 12/1987 | Groth et al. . |
| 4,738,550 | 4/1988 | Gardner . |
| 5,007,745 | 4/1991 | Ball et al. . |
| 5,068,965 | 12/1991 | Ball et al. . |
| 5,127,744 | 7/1992 | White et al. . |
| 5,215,385 | 6/1993 | Ide . |
| 5,271,676 | 12/1993 | Keck et al. . |
| 5,320,431 | 6/1994 | Kallenberger . |

OTHER PUBLICATIONS

Brockwell et al., "Analysis and Testing of the LEG Tilting Pad Journal Bearing ...", Published in *Proceedings of the Twenty–Third Turbomachinery Symposium*, pp. 43–56, Sep. 13, 1994.

"Pivoted Shoe Journal Bearing Engineering Catalog", Published by Orion Corporation, Oct., 1988.

"Equalizing Tilting Shoe Thrust Bearings Engineering Catalog", Published by Orion Corporation, Dec. 1983.

"Hy Film Thrust Bearing with Pocket Feed Lubrication", Published by Waukesha Bearing corporation, Aug., 1991.

*Primary Examiner*—Lenard A. Footland
*Attorney, Agent, or Firm*—Michael Best & Friedrich LLP

[57] ABSTRACT

A tilting pad bearing for a rotatable surface includes a plurality of circumferentially-arranged tilting pads, each of the tilting pads having a working surface, a leading surface and a trailing surface. A lubrication device for lubricating fluid is detachably affixed to the tilt pad leading surface. The lubrication device may have an integrally-formed lubricant flow director with a radial or herringbone shape. The lubrication device has a pair of spaced ridges extending from the base of the device, the ridges being disposed at less than 180° to each other. The ridges may also be parallel to the adjacent pad trailing surface. The ridges have wiper surfaces that wipe hot carryover lubricating fluid from the rotating surface. The hot lubricating fluid is directed by the ridges into an exit annulus or outlet apertures on opposite sides of the lubrication device.

45 Claims, 9 Drawing Sheets

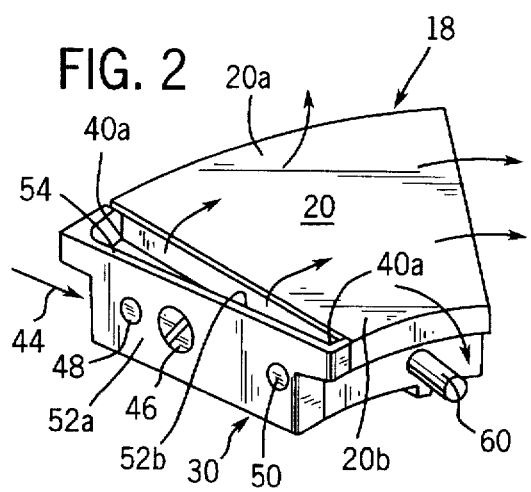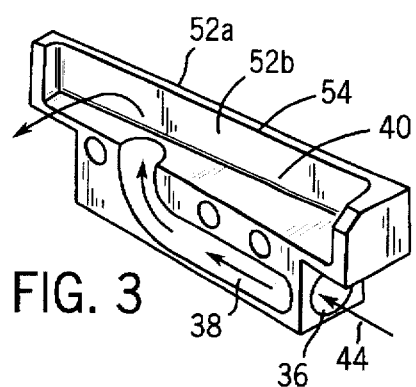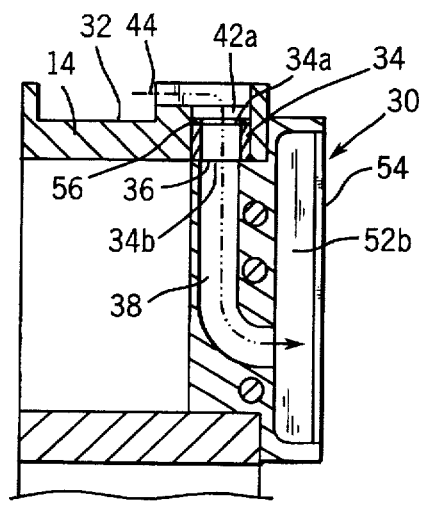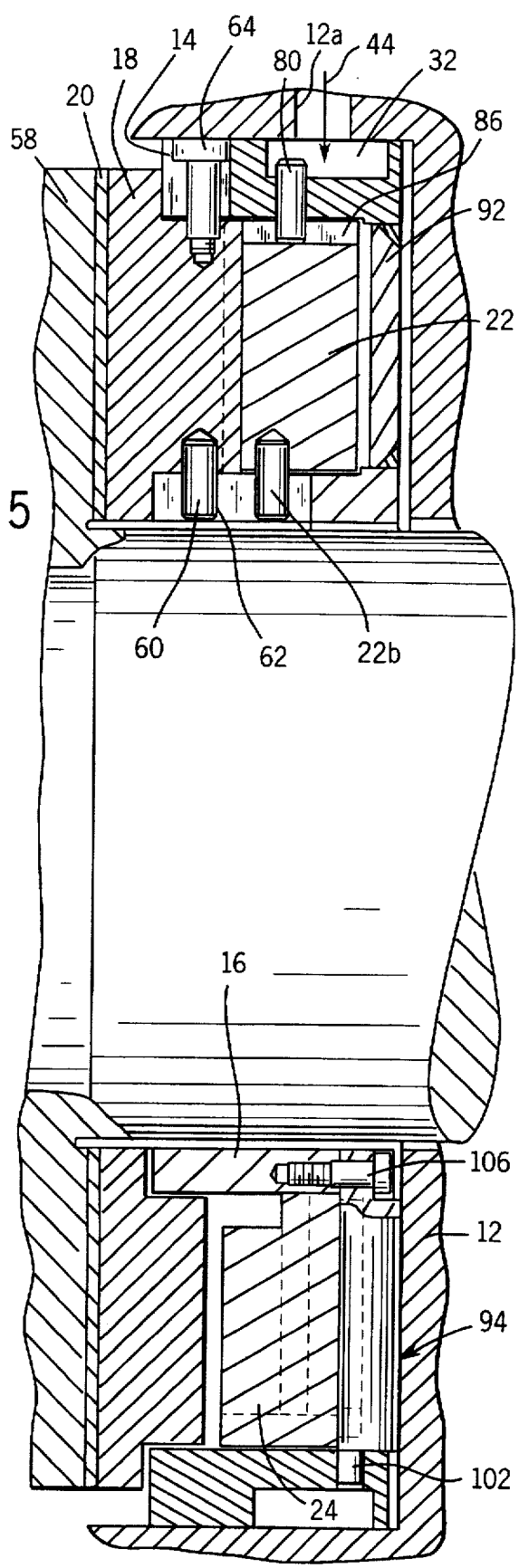

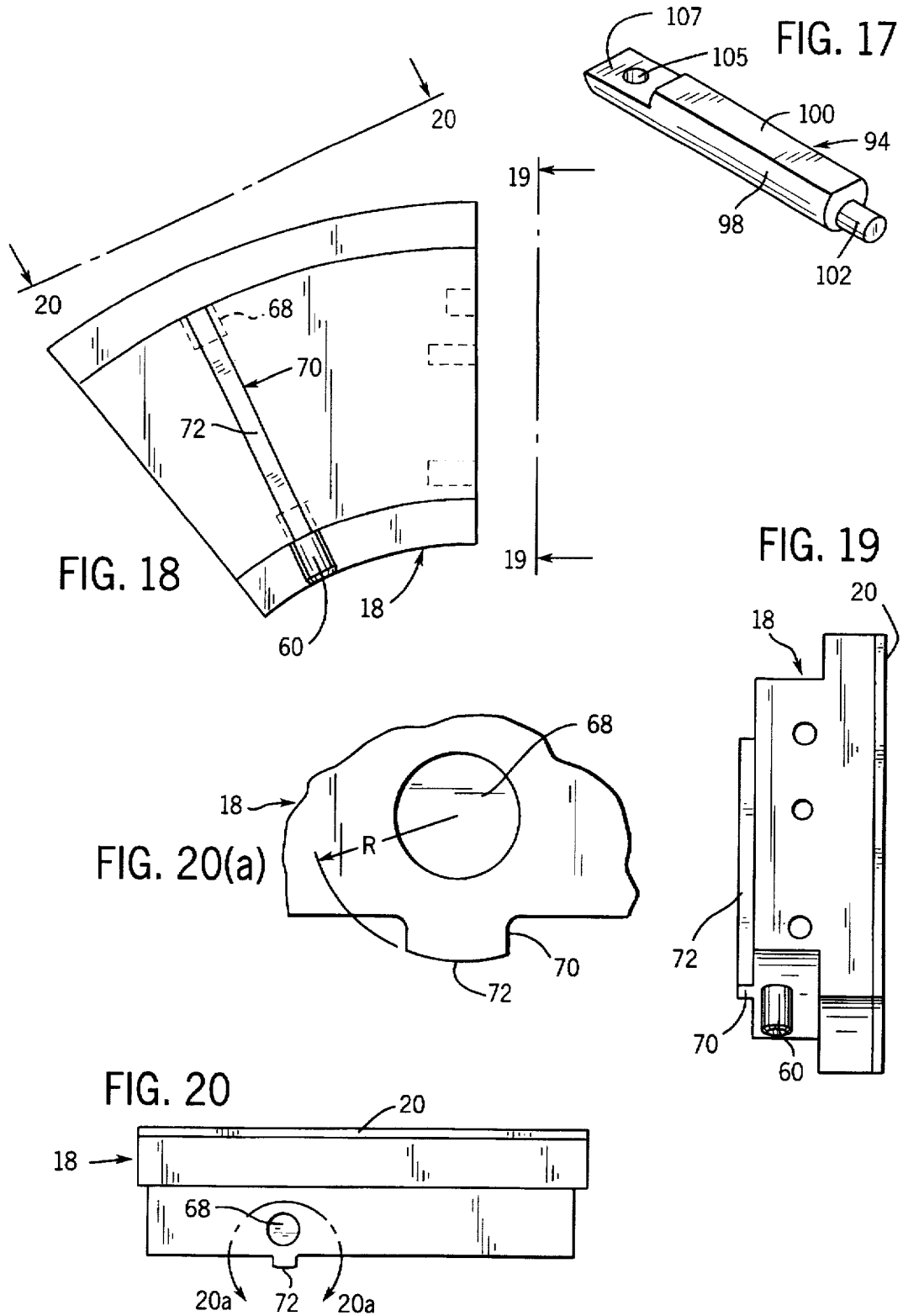

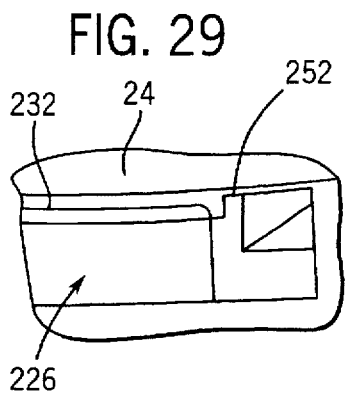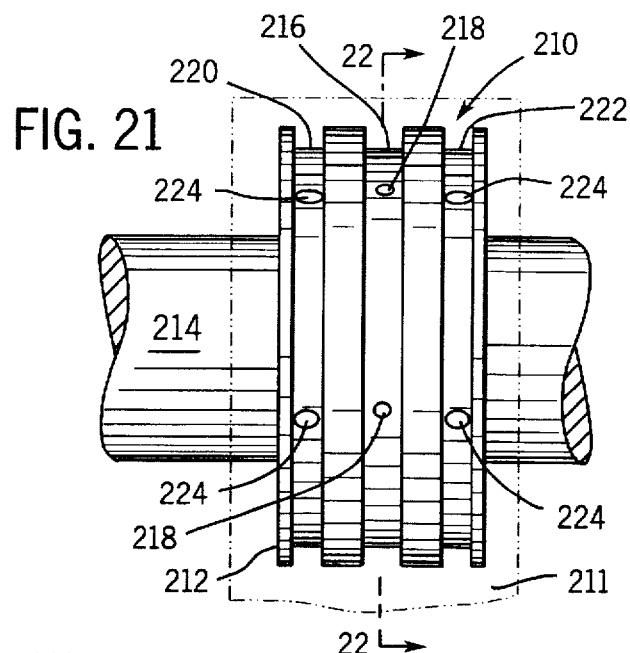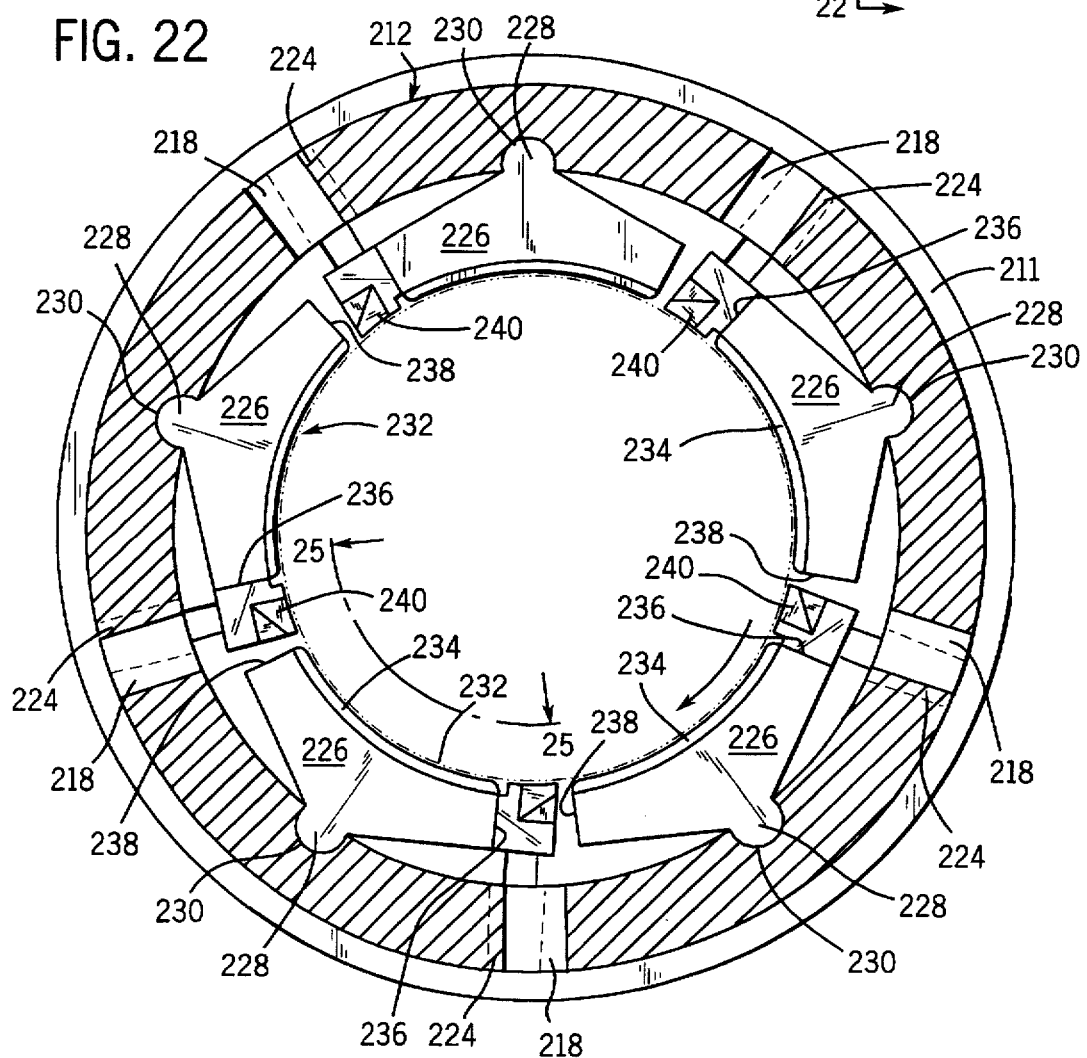

TILT PAD HYDRODYNAMIC BEARING FOR ROTATING MACHINERY

This is Continuation of application Ser. No. 08/542,521, filed Oct. 13, 1995,Entitled "TILT PAD HYDRODYNAMIC BEARING FOR ROTATING MACHINERY", now abandoned.

BACKGROUND OF THE INVENTION

This invention relates to hydrodynamic tilt pad bearings for use in rotating machinery such as generators and turbines. More particularly, this invention relates to the lubrication and cooling of tilt pad thrust and journal bearings and to the manner in which axial loads are handled in tilt pad thrust bearings.

Tilting pad journal and thrust bearings are known for use with high speed rotating shafts and rotating collars. The tilting pads pivot to uniformly distribute the load imposed upon them by the rotating shaft or the rotating collar. Each of the tilt pads typically has a working surface made of babbitt metal that is lubricated by a fluid film.

One major concern with such bearings is that the pad working surfaces be kept below a predetermined temperature to prevent the non-rotating surface from wiping and to maximize the performance of the machinery. The typical way in which the bearing temperature is controlled is by using an excessive volume of cool lubricating fluid. In some prior art bearings, the pad working surfaces are substantially flooded with the lubricating fluid. A disadvantage of such so-called "flooded" bearings is that the amount of oil provided to each tilting pad cannot be controlled. This is a significant disadvantage in the case of journal bearings since the loads applied to the tilt pads in a journal bearing are typically unequal. Therefore, it is desirable to apply varying amounts of lubricating fluid to the tilt pads, based upon their respective loads.

Another disadvantage of flooded bearings is that they require a great deal of lubricating fluid, and corresponding apparatus for circulating substantial amounts of lubricating fluid. Another disadvantage of flooded bearings is that the lubricating fluid must find its way to the drain holes, without being directed towards the drain holes.

Tilt pad thrust bearings are known in which the flow of the lubricating fluid is directed by a lubricant director, as an alternative to simply allowing the fluid to find the exit. For example, U.S. Pat. No. 5,271,676 issued Dec. 21, 1993 discloses a combination journal/thrust bearing having lubricant directors between adjacent thrust tilt pads to direct the flow of lubricating fluid to a succeeding bearing pad in a direction of shaft rotation and to dispose of lubricating fluid from a preceding pad to an oil sump.

In a typical prior art thrust bearing, the lubricating fluid is introduced into the bearing housing, and then proceeds in an axial direction toward the rotating collar before it flows onto the tilting pads. Unfortunately, this path for the fluid causes the lubricating fluid to pick up heat as the fluid moves in the axial direction. The fluid also mixes with the hot carryover fluid from the preceding, adjacent pad. As a result, the temperature of the fluid when it reaches the leading surface of a tilting pad is substantially greater than the temperature of the fluid when the fluid entered the bearing housing. The resulting higher pad temperatures reduce the load carrying ability and the safety margin of the bearing assembly.

In typical equalized tilting pad thrust bearings, the tilting pads are supported by upper equalizing links which in turn are supported by lower equalizing links. The lower links are supported by a retainer. The tilting pad-link assembly is kept together by the retainer, which has an inner retainer ring and an outer retainer ring. Axial loads imposed upon the tilting pads are transferred through the upper and lower links to the retainer, which in turn is disposed within the bearing housing. The tilting pads typically have a spherical lower surface that makes point contact with an upper link so that the tilting pads may pivot in both the radial and the circumferential directions. Each upper link typically contacts two adjacent lower links on two spaced flat surfaces. The lower links in turn transfer the axial loads to the retainer.

There are several disadvantages to the prior art equalized bearing described above. First, the tilting pads tend to thermally and elastically deflect in the axial direction about their respective pivots under high axial loads, thereby reducing the effective bearing surfaces of the tilting pads. The load carrying ability and the bearing safety margin are reduced.

A second disadvantage of such prior art equalized tilting pad bearings is that the bearing has a high profile because of the number of components that are stacked onto each other. The tilting pads are stacked on the upper links, which in turn are stacked on the lower links. The lower links rest on the retainer, which in turn is enclosed by the bearing housing. The height of a typical equalized thrust bearing (with a 10.5" O.D.) is about 3.38 inches.

SUMMARY OF THE INVENTION

A tilting pad bearing is disclosed for use in connection with a rotatable surface such as a rotating shaft or a collar affixed to a rotating shaft. The tilting pad bearing may be a thrust bearing or a journal bearing.

In its broadest form, the present invention includes a plurality of circumferentially-arranged tilting pads, each of the tilting pads having a working surface, a leading surface and a trailing surface. The tilting pads are supported by a retainer, or by equalizing links if the bearing is an equalized thrust bearing. The invention includes a detachable lubrication device, interconnected with at least some of the pad leading surfaces, for supplying a lubricating fluid to at least some of the working surfaces, and an outlet means for receiving hot lubricating fluid after the fluid has passed over at least a portion of a pad working surface. The detachable lubrication device is fastened to the pad leading surface by at least one fastener, and includes an inlet aperture that receives lubricating fluid.

In a thrust bearing embodiment, the detachable lubrication device includes a pocket feed cavity or channel that widens from a first end where the lubricating fluid is received, to an opposed second end so that a non-uniform amount of lubricating fluid flows to the pad working surface. This embodiment may also include a piston disposed in the inlet aperture of the inlet means that seals the inlet means against fluid leakage.

In a journal bearing embodiment of the invention, the detachable lubrication device includes a wiper means for wiping lubricating fluid from the rotatable surface. The wiper means preferably includes at least one ridge interconnected with the detachable lubrication device. In one embodiment, two ridges are used, with the ridges forming an included angle of less than 180° to each other.

In a journal bearing embodiment of the present invention, the detachable lubrication device includes a herringbone-shaped flow director that directs the flow of lubricating fluid which has passed over a pad working surface to two opposed outlet means on opposite sides of the flow director. The flow director preferably comprises two adjacent ridges disposed at an angle to each other, so that the hot lubricating fluid is evenly directed to both outlets. The inlet aperture for cool lubricating fluid is positioned downstream of the two ridges, adjacent to the junction of the ridges.

The present invention includes another aspect when the tilting pad bearing is an equalized thrust bearing. In this embodiment, the present invention includes improved means for handling the axial loads imposed by the rotating collar upon the bearing. Thermal and elastic deflection of the tilt pad are reduced by forming an elongated rib with a cylindrical contact surface for contacting the flat surface of an upper equalizing link member. To achieve radial tilting of the pad, the upper link members and the lower link members are designed such that there is point contact between the upper and lower link members. The upper and lower link members are made of hardened steel so that the axial loads may be borne without damage to the link members. The lower link member makes a cylinder-in-cylinder conformal contact with a link pin. The link pin engages the outer bearing housing in a flat-on-flat contact instead of the bearing retainer, to reduce the overall height of the bearing assembly.

It is a feature and advantage of the present invention to provide a lubrication device for a thrust or journal bearing that is detachable and retrofitable onto existing tilting pad bearings.

It is yet another feature and advantage of the present invention to reduce the amount of lubricating fluid required in a tilt pad bearing by using a lubrication device for lubricating fluid.

It is yet another feature and advantage of the present invention to provide cooler lubricating fluid to a pad working surface than in prior art tilt pad bearings.

It is yet another feature and advantage of the present invention to remove hot carryover lubricating fluid from a rotating surface such as a shaft or collar.

It is yet another feature and advantage of the present invention to improve the handling of loads in tilt pad bearing to extend bearing life.

It is yet another feature and advantage of the present invention to direct the flow of hot lubricating fluid to both sides of a tilting pad journal bearing in an equal manner and to direct flow of hot lubricating fluid to the bearing exterior through radial channels shaped like rectangular prisms in a thrust bearing.

These and other features and advantages of the present invention will be apparent to those skilled in the art from the following detailed description of the preferred embodiments and the drawings, in which:

BRIEF DESCRIPTION OF THE DRAWINGS

FIG. 2 is a perspective view of a thrust embodiment of a detachable lubrication device affixed to a tilting pad.

FIG. 3 is a perspective view of the detachable lubrication device depicted in FIG. 2.

FIG. 5 is a cross sectional view of the thrust bearing of FIG. 1, taken along line 5—5 of FIG. 1.

FIG. 6 is a cross sectional view of one embodiment of the detachable lubrication device, taken along line 6—6 of FIG. 1.

FIG. 17 is a perspective view of a link pin used in an equalized thrust bearing embodiment.

FIG. 18 is a bottom view of a tilting pad used in the bearing of FIG. 1.

FIG. 19 is an end view of the tilting pad, taken along line 19—19 of FIG. 18.

FIG. 20 is a side view of the tilting pad, taken along line 20—20 of FIG. 18.

FIG. 20a is an exploded sectional view of a tilting pad, taken along line 20a—20a of FIG. 20.

FIG. 21 is a side view of a journal bearing embodiment of the bearing assembly according to the present invention.

FIG. 22 is an end cross sectional view of the bearing, taken along line 22—22 of FIG. 21.

FIG. 29 is a cross sectional view of the tilt pad-lubrication device, taken along line 29—29 of FIG. 28.

DETAILED DESCRIPTION

Figure 1:
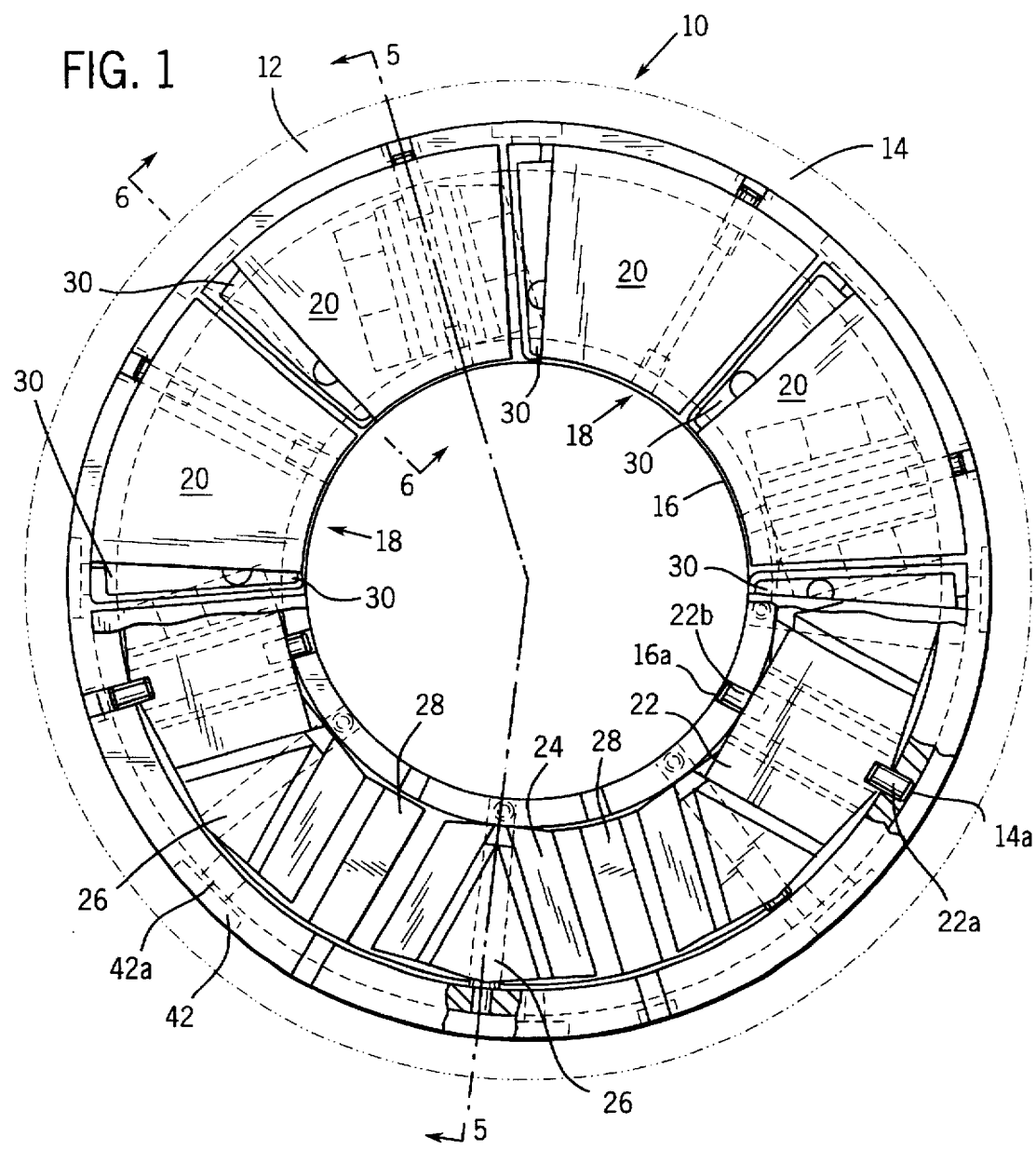
FIG. 1 is a plan view of a thrust bearing incorporating the present invention.

In its broadest form, the present invention includes a detachable, lubrication device for providing cool lubricating fluid to a tilting pad working surface. The lubrication device may be attached near the leading surface of a tilting pad used for either a thrust or a journal bearing. The thrust embodiment described below and depicted in FIGS. 1 through 20a is specifically designed for use in a thrust bearing. The journal embodiment depicted and described in connection with FIGS. 21 through 29 is specifically designed for use in a journal bearing.

In both embodiments, the lubrication device for providing cool lubricating fluid may include at least one ridge that wipes hot carryover lubricating fluid from a rotating surface. The wiper of the thrust embodiment consists of a single ridge having a substantially flat surface. In the journal embodiment designed for journal bearings, the wiper consists of two surfaces disposed on respective ridges, with the ridges being joined at a junction.

In both embodiments, the lubrication device for the lubricating fluid is shown rigidly affixed to the leading surface of the tilting pad, but may be spring or pressure loaded to remove or shear even more of the hot carryover lubricating fluid from the rotating shaft or collar. The spring may be an actual spring element or an integral structural element.

Also in both embodiments, the lubrication device for the lubricating fluid may be made from a material having a higher coefficient of thermal expansion than the material from which the tilting pad is made. This difference in materials enables the lubrication device to expand toward the rotating shaft or collar to a greater extent than the tilting pad, thereby increasing the effectiveness of the wiping of hot carryover fluid.

In addition to these features, common to both the thrust and journal embodiments, each of the lubrication devices of the thrust and journal embodiments has features that are not found in the other embodiment. These features tend to make the particular lubrication device more suitable for use in a specific thrust bearing or journal bearing.

Besides the lubrication device, the present invention includes unique features that increase the ability of the bearing to handle the high axial loads imposed when the invention is used in a thrust bearing. The manner in which the tilting pad contacts the upper link, the manner in which the upper link contacts the lower link, and the manner in which the lower link and link pin contact the bearing housing, are changed to improve axial load handling. Also, the thrust bearing has a lower profile compared to prior art thrust bearing since axial loads are imposed on the bearing housing through the link system, instead of on the bearing retainer. Also, a movable piston allows lubricating fluid to be transferred from the retainer to lubrication device without a high leakage rate.

Referring now to the specifics of the invention, FIGS. 1 through 20a all relate to a thrust embodiment of the present invention. The thrust embodiment is suitable for use in an equalized, tilting pad thrust bearing, although it may have other applications as well.

FIG. 1 is a plan view of a thrust embodiment of the present invention. In FIG. 1, thrust bearing assembly 10 includes a bearing housing 12, an outer retainer member 14, an inner retainer member 16 (shown in phantom), a plurality of tilting pads 18 having working surfaces 20 thereon, a plurality of upper link members 22 disposed beneath tilting pads 18, and a plurality of lower link members 24 disposed generally beneath upper link members 22 in the axial direction. Lower link members 24 are supported by link pins 26, shown in phantom. Link pins 26 are connected between outer retainer member 14 and inner retainer member 16. Outer retainer member 14 and inner retainer member 16 are separated from to each other by a plurality of ribs 28.

Figure 11:
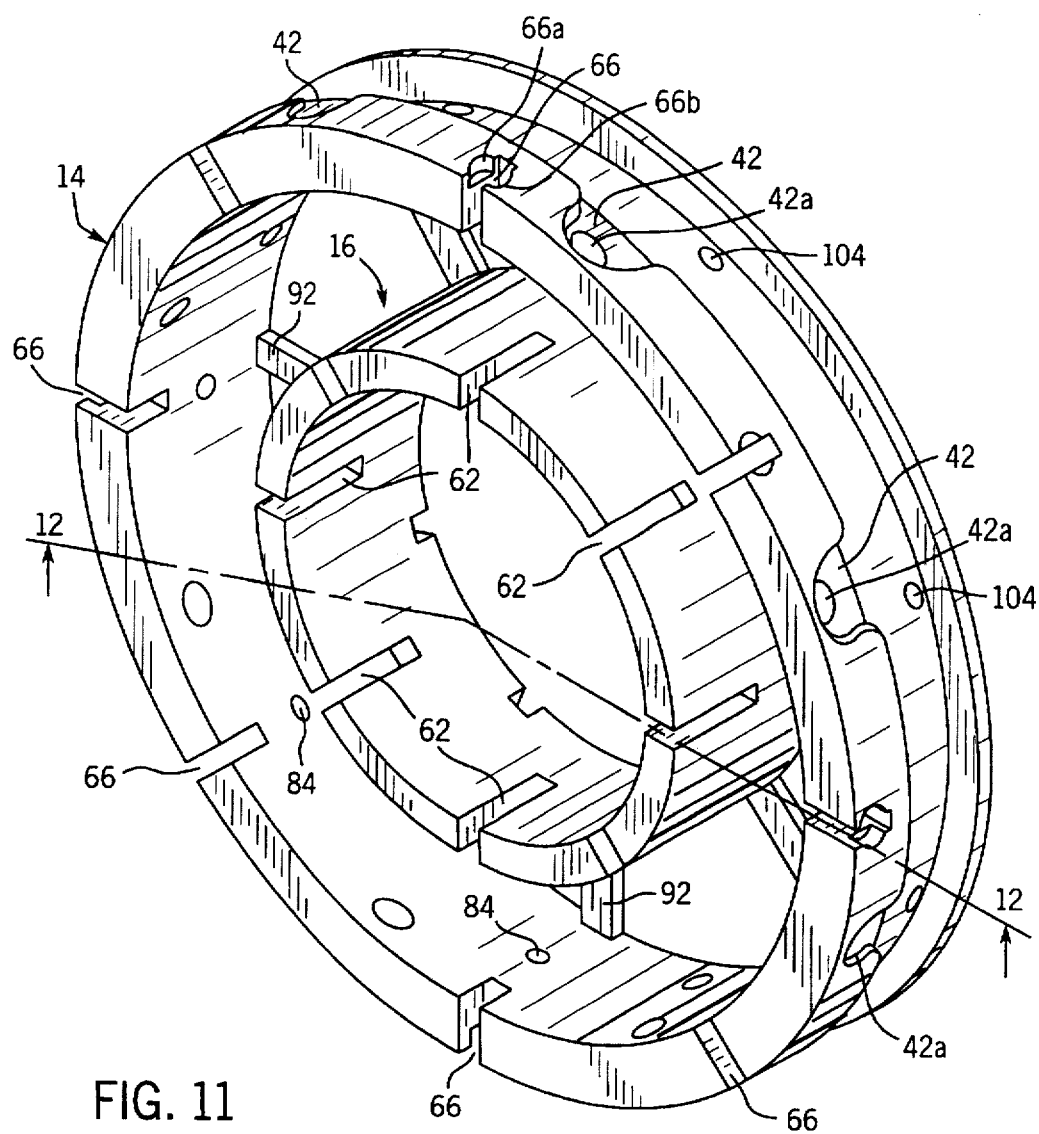
FIG. 11 is a perspective view of the retainer used in the embodiment of FIG. 1.
Figure 12:
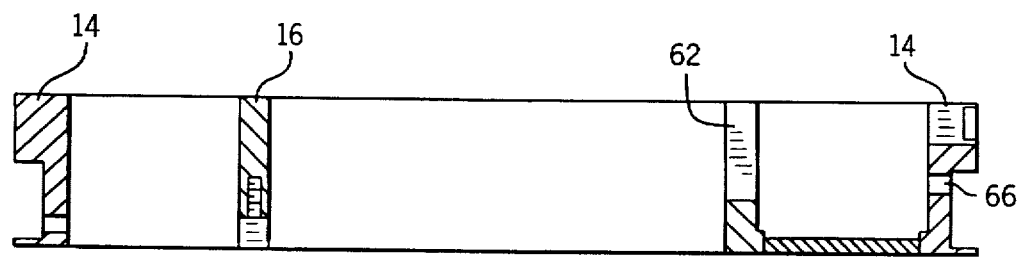
FIG. 12 is a cross sectional side view of the retainer, taken along line 12—12 of FIG. 11.

Each of upper link members 22 has an outer slot 86 that receives a pin which is pressed into aperture 84 of the retainer in FIG. 11 and is guided therein. Similarly, each of upper link members 22 has an inner pivot pin 22b that is received in a slot 16a of inner retainer member 16 and is pivotable therein.

At least some, and preferably all, of tilting pads 18 has fixed to their leading surfaces (in the direction of collar rotation) a detachable lubrication device 30 that receives cool lubricating fluid from a source of pressurized fluid (not shown). The lubricating fluid proceeds from the pressurized source through one or more hydraulic lines (not shown) and through an aperture 12a (FIG. 5) in the bearing housing. The cool lubricating fluid then passes into an annular groove 32 (FIG. 4) in the outer periphery of outer retainer 14, and moves in the radial direction through channel 42, piston 34 (FIG. 6) and through inlet aperture 36, into conduit 38 (FIG. 3), and into pocket feed cavity 40 of lubrication device 30 (FIG. 3). Conduit 38 is partially formed by lubrication device 30, but is also enclosed by the leading end of tilt pad 18. Pocket feed cavity 40 is defined by an open upper side, a bottom wall, a side wall adjacent to the leading surface of the pad, a pocket feed surface 52b, and two end surfaces 40a and 40b.

Figure 10:
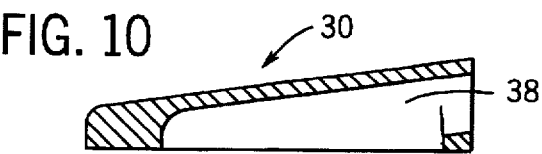
FIG. 10 is a cross sectional view of the lubrication device, taken along line 10—10 of FIG. 8.

FIG. 10 is a cross-sectional view of lubrication device 30 that depicts the shape of conduit 38 in the radial direction. In FIG. 6, piston 34 is received in an aperture 42a (FIGS. 1 and 4) formed within outer retainer member 14. Aperture 42a is designed to allow piston 34 to move back and forth in the radial direction by a self-actuated hydraulic force as the piston follows the movement of the tilting pad. At the same time, piston 34 seals against lubricating device 30 to limit fluid leakage.

FIGS. 2, 3 and 6 depict the movement of the lubricating fluid, shown by arrow 44, into lubrication device 30 and onto working surface 20 of pad 18. In FIGS. 2, 3 and 6, lubricating fluid 44 passes through aperture 36 into conduit 38, and into pocket feed cavity 40. Conduit 38 may have a right angle bend, as depicted in FIG. 3. As shown in FIGS. 2, 3, 9 and 10, cavity 40 is wider near its opposite end 40a, and is narrower near its inlet end 40b. This profile is designed to provide a variable amount of lubricating fluid to the working surface 20 of tilt pad 18. Since the radially outward section 20a of working surface 20 has a greater angular velocity and a greater surface area, it requires more lubricating fluid than the radially inward section 20b of working surface 20. See FIG. 2.

As best shown in FIG. 2, lubrication device 30 is detachably affixed to the leading surface of tilt pad 18 by a metal screw 46. Lubrication device 30 is kept in proper alignment with tilting pad 18 by two dowel pins 48 and 50 disposed on opposite sides of metal screw 46 such that surface 54 remains parallel to surface 20.

As best shown in FIGS. 2, 3, 6 and 9, lubrication device 30 also includes a lubrication director surface 52a and a pocket feed surface 52b. Director surface 52a is substantially parallel to the trailing surface of the adjacent pad. Upper wiper surface 54 may be used to wipe hot carryover fluid from the rotating collar surface. Upper wiper surface 54 lies substantially transverse to the direction of collar rotation and lubricant flow.

A push-in-ring 56, which is press-fit in aperture 42a or in indentations formed during a staking procedure around aperture 42a, limits radial outward motion of piston 34 and secures piston 34 within the assembly. The piston has a constant pressure pushing against its upstream end and a linear decreasing pressure from the piston inside diameter to the outside diameter pushing against the downstream end of the piston. The pressure differential moves the piston against the pad to bridge the retainer to pad gap, thus reducing leakage.

FIG. 6 more clearly depicts piston 34, which is disposed adjacent to aperture 36 in lubrication device 30. In FIG. 6, piston 34 is moveable in the radial direction within aperture 42a. The radially outward movement of the piston is limited by a staking or ring 56 having tangs, said ring 56 being press-fit into retainer 14. The radially inward movement of the piston is limited by a counterbore in retainer aperture 42a. This arrangement allows piston 34 to move in conjunction with lubrication device 30. Lubrication device 30 moves when tilt pad 18 moves in response to loads imposed upon the tilt pad.

FIGS. 5 and 7 and FIGS. 11 through 20 relate to another feature and advantage of the thrust embodiment, namely the improved handling of axial loads imposed by the rotating collar.

Figure 7:
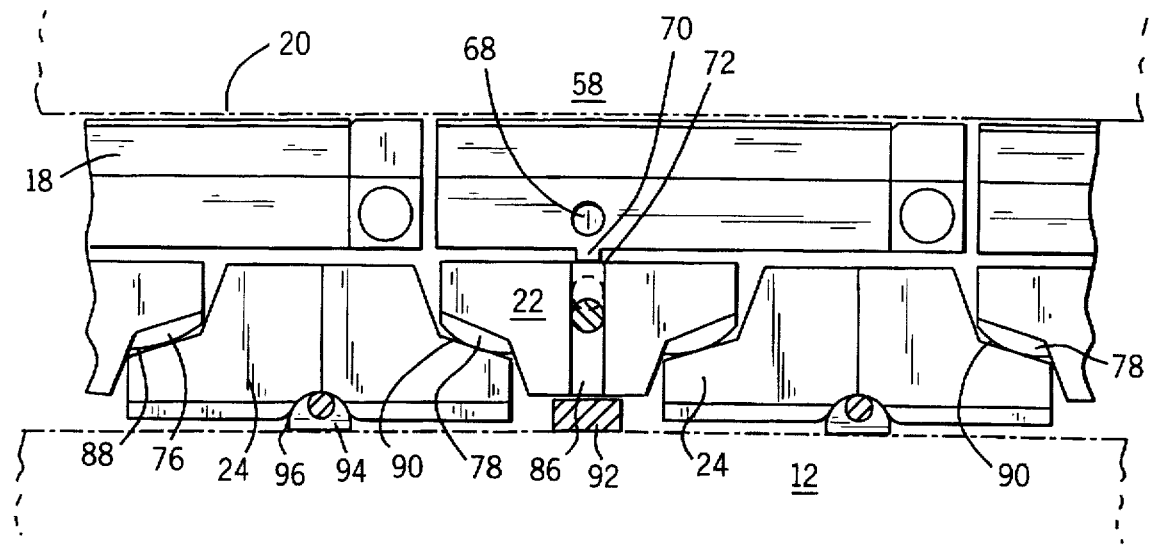
FIG. 7 is an exploded side view of an equalized thrust bearing assembly, the retainer having been removed.
Figure 8:
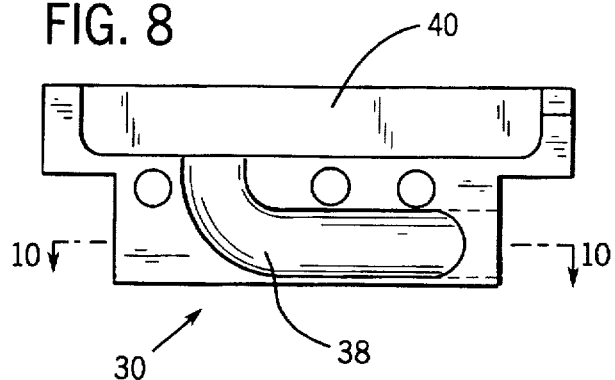
FIG. 8 is an end view of the detachable lubrication device of FIG. 3.
Figure 9:
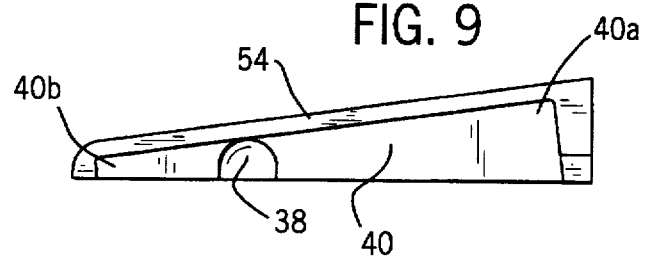
FIG. 9 is a top view of the lubrication device of FIG. 8.

As best shown in FIGS. 5 and 7, each of tilt pads 18 has a working surface 20 of babbitt metal disposed thereon. Working surface 20 engages rotating collar 58, as best shown in FIG. 5.

As best shown in FIG. 5, tilting pad 18 is located circumferentially by a dowel pin 60 disposed in a slot 62 (FIG. 11) of inner retainer member 16 (FIG. 11), and tilting pad 18 is retained by a removable, screw-type pin 64 (FIG. 5). Pin 64 is received in a slot 66 (FIGS. 4 and 11) and is received in an aperture 68 (FIG. 7 and 20) in tilt pad 18. Aperture 66 is formed in outer retainer member 14, as best shown in FIG. 11. Sides 66a and 66b that define aperture 66 are machined into respective arcuate shapes to receive the head of screw 64 (FIG. 5), thereby preventing screw 64 from moving in an axial direction out of aperture 66.

Figure 13:
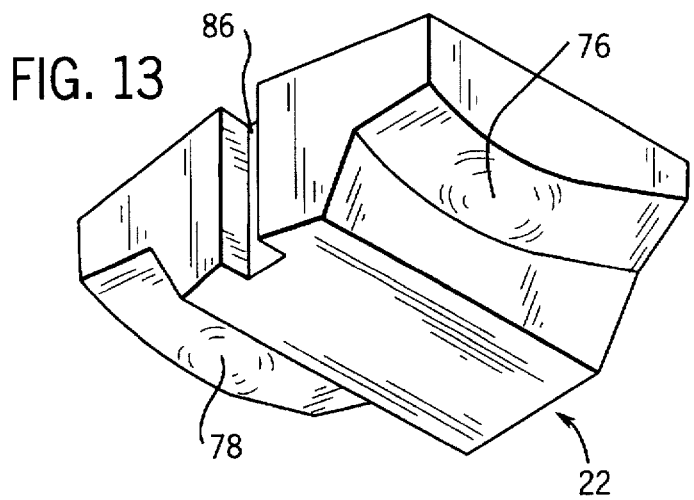
FIG. 13 is a perspective view of an upper equalizing link member.

Upper link member 22 is retained in position by two dowel pins 80 and 22b, as best shown in FIG. 5. Each of dowel pins 80 is received in a slot 86 of upper link member 22 (FIG. 5). Each of dowel pins 22b is received in a slot 62 (FIG. 11) and is movable therein in the axial direction to allow radial and circumferential tilting of upper link member 22. As best shown in FIGS. 5, 7 and 13, each of upper link members 22 has a slot 86 that receives a dowel pin 80. Guided by pin 80, upper link member 22 is allowed to move in the axial direction along slot 86, thereby providing for radial and circumferential tilting of upper link member 22.

Tilting pad 18 has an elongated rib 70 (FIGS. 7, 18 and 20) disposed beneath pin 60 (FIG. 2) in the radial direction. Rib 70 has a substantially cylindrical surface 72, as best shown in FIG. 7 and FIGS. 18 through 20a. Surface 72 makes contact with a substantially flat upper surface 74 (FIG. 7, 14 and 15) on upper link member 22, resulting in "line contact" of a cylinder on a flat surface. In typical prior art equalized bearings, the tilting pad has a spherical contact surface on its lower side, resulting in "point contact" with the upper link member. The typical prior art design allowed the tilting pad to thermally and elastically deflect in the axial direction about the spherical point contact. In the present invention, the use of an elongated rib 70 and cylindrical surface 72 provides better distribution and handling of the axial loads imposed by the rotating collar on the tilting pad, thereby reducing the axial deflection of the tilting pad.

Figure 14:
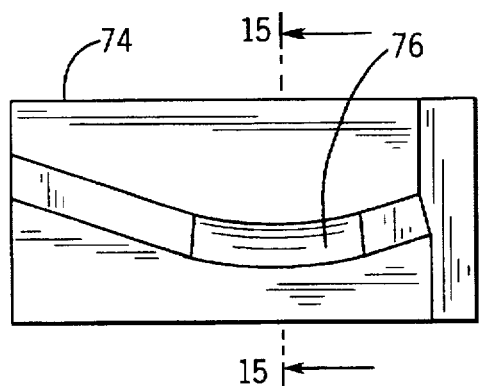
FIG. 14 is a side view of the upper link member of FIG. 13.
Figure 15:
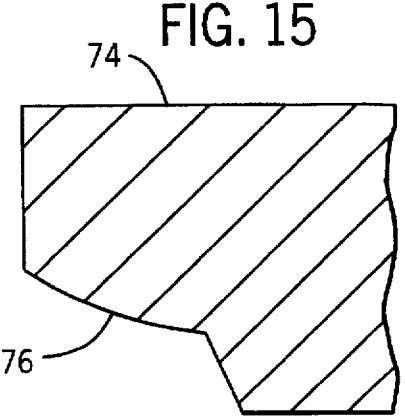
FIG. 15 is a cross sectional view of the load bearing surface of the upper link member, taken along line 15—15 of FIG. 14.

The prior art thrust bearings used point contact between the tilting pad and the upper link to enable the tilting pad to tilt in both the circumferential and radial directions. The use of elongated rib 70 in the present invention, however, allows the tilting pad to tilt only in the circumferential direction with respect to upper link 22. To enable the tilting pad of the present invention to tilt in the radial direction, the present invention uses point contact between upper links 22 and lower links 24. Point contact is achieved by forming spherical surfaces 76 and 78 on each wing of upper link members 22. Surfaces 76 and 78 are best shown in FIGS. 13 through 15. As shown in these figures, surfaces 76 and 78 are curved in both the radial direction and in the circumferential direction with different arcs.

Figure 16:
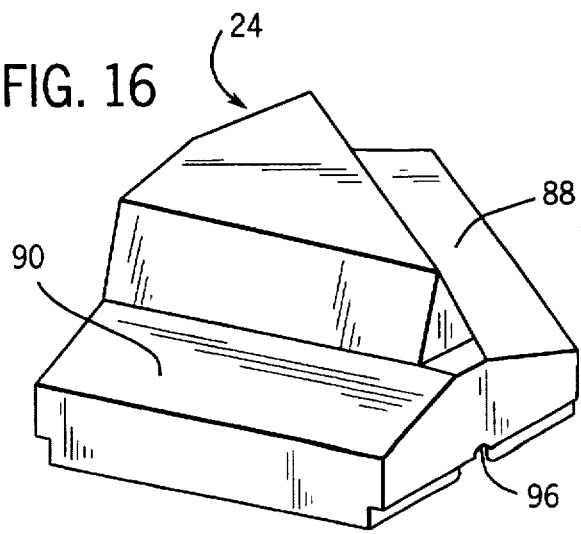
FIG. 16 is a perspective view of a lower equalizing link member.

Each of spherical surfaces 76 contacts a substantially flat surface 88 on lower link member 24 (FIGS. 7 and 16). Similarly, each of spherical surfaces 78 contacts a substantially flat surface 90 on lower link member 24 (FIGS. 7 and 16). Surfaces 88 and 90 are angled with respect to the horizontal axis.

Upper link members 22 are disposed above ribs 92, as best shown in FIGS. 5 and 7. However, upper link members 22 are not supported by ribs 92. Ribs 92 connect outer retainer member 14 and inner retainer member 16, as best shown in FIG. 11.

Lower link members 24 are pivotable on link pins 94, as best shown in FIG. 7. Lower link members 24 have respective cylindrical surfaces 96 that engage an outer cylindrical surface 98 of link pin 94. Link pin 94 is best shown in FIGS. 5 and 17. As shown in FIG. 17, link pin 94 has a lower flat surface 100 that engages bearing housing 12. Link pin 94 has an integral pin 102 that is received in aperture 104 of outer retainer 14 (FIG. 11). Link pin 94 also has an aperture 105 (FIG. 17) which receives a screw fastener 106 (FIG. 5) that fastens one end of the link pin to inner retainer member 16 but allows axial float of the link pin along screw 106, as shown in FIG. 5. That is, the distance between the uppermost portion of surface 98 and flat 107 on pin 94 (FIG. 17) is less than the height of the shoulder on screw 106 in the axial direction to allow the link pins to position themselves in the axial direction along screw 106.

Surface 96 of lower link member 24 and surface 98 of link pin 94 make cylinder-to-cylinder conformal contact with each other, thereby allowing lower link member 24 to pivot in the circumferential direction. See FIG. 7. Link pin 94 is made from non-hardened steel.

As best shown in FIG. 7, axial loads from rotating collar 58 are transmitted to bearing housing 12 in the following manner. The axial load from collar 58 is imposed upon tilting pads 18. Tilting pads 18 tilt in the circumferential and/or radial directions in response to the load being imposed by collar 58. If a tilting pad 18 has a higher load than adjacent pads, its associated upper link 22 will move in a direction to equalize pad loads, thereby imposing a load on the associated lower link 24. If the collar is misaligned, the tilting pads that have a radial component of motion due to the misalignment will rotate in the radial direction, and upper link 22 will tilt in the radial direction in unison with the tilting pad, thereby imposing a load on both of the associated lower links 24. Lower link 24 pivots in the circumferential direction on link pin 94. Thus, axial loads are transmitted from the tilting pads to link pin 94, and thereafter to bearing housing 12.

In prior art bearings, the lower link members imposed the axial loads on the bearing retainer, which in turn was enclosed by the bearing housing. The retainer enclosed both the sides and the lower end of the bearing assembly. This prior art arrangement resulted in a bearing assembly requiring additional overall height. In the present invention, however, the lower link members impose the load on the link pins which in turn impose the load directly on the bearing housing instead of on the retainer. The retainer has an open end and does not enclose the lower end of the bearing assembly. As a result, the overall height of the bearing assembly is reduced substantially.

The manner in which the axial loads are handled in the thrust embodiment of the invention is expected to increase the longevity of the equalized bearing because the places at which the forces are concentrated are made of hardened steel and are thus much more capable of handling the high load forces. For example, upper link member contacts lower link member in a point contact, but both the upper and lower links are made of hardened steel. However, those components of the bearing assembly which are made of softer materials, such as the tilting pad and the link pin, contact other components with line or conformal contact respectively, thereby distributing the load compared to prior art tilt pad bearings. This arrangement is expected to substantially reduce cracking and pitting of the tilting pad and other components at the contact locations.

Figure 4:
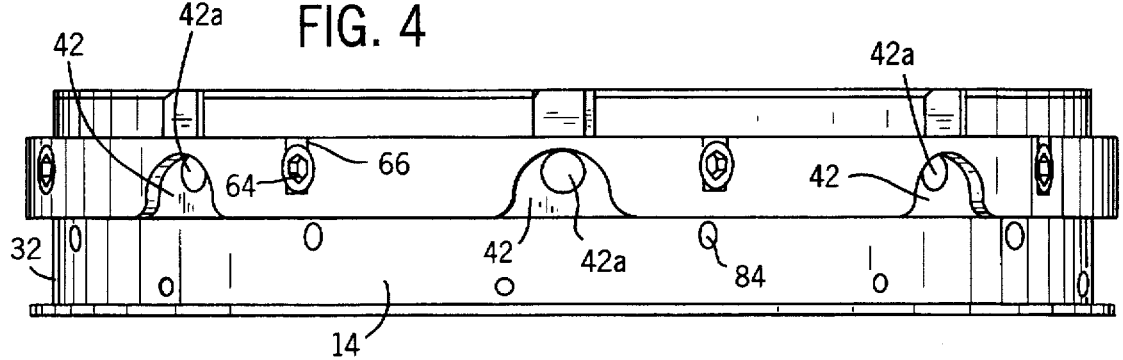
FIG. 4 is a side view of the thrust bearing depicted in FIG. 1.

Another feature of this invention is the lower pressure drop of the fluid delivered to pocket feed cavity 40 of lubrication device 30 (FIG. 5). Cavity 42 has the shape of a segmented circular channel, as best shown in FIG. 4. The delivery path consisting of groove 32, the segmented circular channel shape of cavity 42, piston 34, and conduit 38 together enable a lower pressure lubricant delivery system to be used.

Another feature of this invention is radially located piston 34. Piston 34 functions as a conduit or channel to convey the cool lubricant to the lubrication device 30 with minimum leakage and a lower pressure drop. The piston moves radially and positions itself against aperture 36 of lubrication device 30 and on pad 18 by an imbalance of hydraulic forces on upstream face 34a and downstream face 34b of piston 34. The upstream face encounters a flat pressure distribution over its annulus. The downstream face encounters a triangular pressure distribution waveform in the radial direction over its annulus with zero pressure at the outside diameter of the piston.

Other embodiments may substitute or increase the pressure differential sealing force by area differences on piston faces 34a and 34b, or may use an orifice type pressure drop on the piston.

Another feature of the invention is the ability of piston 34 to seal against a pad assembly which moves in 2 directions in the transverse plane because the pad pivot is not at the center of the piston. The transverse displacement of the pad varies with pad axial load, and piston face 34b seals against lubrication device 30 to accommodate this movement.

Another feature of the thrust embodiment is the lubricant flow path in the retainer. The flow in the axial direction is through retainer channel 42 (FIG. 11) that has a decreasing cross-section for fluid flow. Channel 42 has a segmented circular shape, with a segmented circular side wall and a bottom wall. This shape reduces fluid energy loss. This geometry will make the pressure loss lower than prior art thrust bearings.

Another feature of the thrust embodiment is that piston 34 is held in retainer ring 14 by staking or by a push-in star retainer 56 at piston face 34a, and by lubrication device 30 at piston face 34b. In another embodiment, piston face 34b is restrained by a counterbore in retainer aperture 42a which holds the piston such that the counterbore flange retains the piston. In all embodiments, the piston is free to move axially to seal against lubrication device 30.

Another feature of the thrust bearing retainer is its reduced cost. Prior art bearings require parallelism between the retainer back and retainer link cavity bottom. In the thrust embodiment of the present invention, the retainer is between 0.010 and 0.025 inches from the axial surface of the housing. Only the link pins contact the housing, and parallel surfaces in the retainer are not required.

Another feature of the thrust bearing embodiment is that the retainer may have a reduced structure since it is not carrying the axial load. It only positions and retains the assembly components radially and circumferentially.

Another feature of the thrust bearing embodiment is that the link pin functions in five ways. The link pin transfers the axial load to the bearing housing. The link pin positions the retainer axially in the housing. It floats axially, allowing the lower link pin to align itself with the lower link for proper pad equalization with lower contact stresses. The link pin prevents rotation of the lower link, and the link pin holds the assembly together for shipping.

Another feature of the invention is best shown by reference to FIG. 3, 5 and 6. As shown in FIG. 6, cool lubricating fluid, designated by arrow 44, enters bearing housing 12 through aperture 12a. The cool lubricating fluid then flows in the circumferential direction into annular groove 32, makes a slight turn in the axial direction as depicted in FIG. 6, and then proceeds substantially in a radial direction through aperture 42a, piston 34, aperture 36, and into conduit 38. In a typical prior art equalized thrust bearing, the cool lubricating fluid travels a significant distance in the axial direction along the rotating shaft. As the lubricating fluid travels in the axial direction, it picks up heat due to shearing between the bearing retainer and the rotating shaft, thereby increasing the temperature of the lubricating fluid and also the pad working surface. The safety margins are thereby reduced. In the present invention, the cooling lubricating fluid temperature is less than in the prior art because substantial amounts of heat are not added due to shear between the shaft and the retainer, between the rotating collar and the bearing housing, and between adjacent pads.

FIG. 21 is a side view of a bearing assembly according to the journal embodiment of the present invention. The journal embodiment depicted and described in connection with FIGS. 21 through 29 is preferably used in a journal bearing. In FIGS. 21 and 22, pads 226 are enclosed in a retainer 212, which in turn is enclosed in a bearing housing 211. Pads 226 are disposed circumferentially around a rotatable shaft 214.

In FIG. 21, bearing retainer 212 has a plurality of annular grooves therein. Cool, lubricating fluid is provided to bearing 210 along an annular groove 216, and specifically through input apertures 218 spaced along annular groove 216. Peripheral grooves 220 and 222 receive hot lubricating fluid that is output from the bearing via output apertures 224.

The hot lubricating fluid is provided to a lubrication reservoir (not shown) through fluid lines, as is well known in the art. Likewise, cool lubricating fluid is provided to input apertures 218 from the reservoir via additional fluid lines, as is well known in the art.

FIG. 22 is a side cross sectional view of bearing 210 of FIG. 21, taken along line 22—22. In FIG. 22, retainer 212 surrounds a plurality of tilting pads 226. Each of tilting pads 226 is pivotable about a respective pivot 228 that is received in a pivot recess 230 of retainer 212. Pivots 228 are centered with respect to their respective working surfaces 232 of pads 226. However, pivots 228 could be offset with respect to working surfaces 232, as is well known in the art.

Each of tilt pads 226 is primarily comprised of a metal selected from the group consisting typically of steel, or of another material having a lower coefficient of thermal expansion than lubrication device 242. Working surfaces 232 of pads 226 consist of a layer of babbitt metal 234. Each of tilt pads 226 has a leading surface 236 and a trailing surface 238.

A lubrication device 242 is attached near leading surface 236 of each of tilt pads 226. Lubrication device 242 will be discussed in greater detail in connection with FIGS. 23 through 29.

Figure 27:
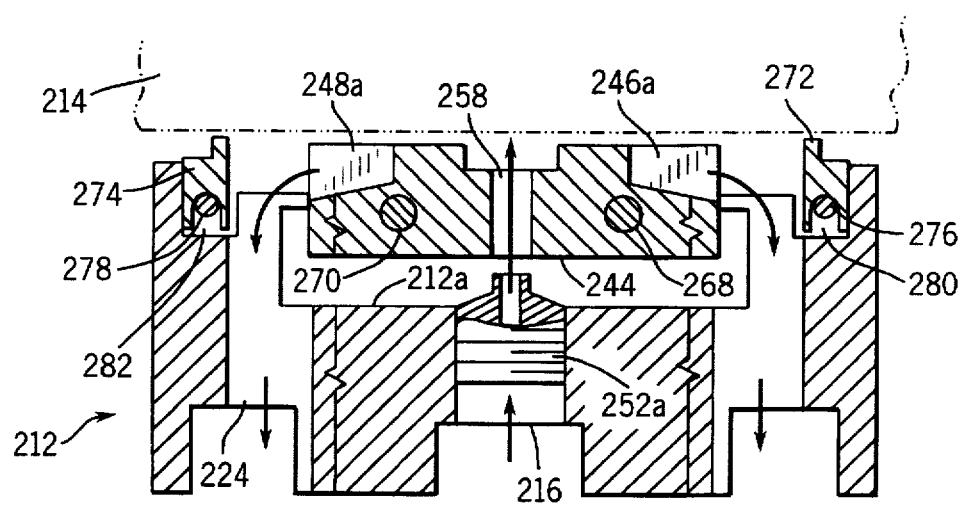
FIG. 27 is an end cross sectional view of the journal bearing embodiment of the bearing assembly, taken along line 27—27 of FIG. 25.

As also shown in FIG. 22, retainer 212 includes a plurality of input apertures 218 that receive cool lubricating fluid, as discussed above in connection with FIG. 21. Apertures 218 provide the cool lubricating fluid to input apertures 258 in each of the lubrication devices 242, as best shown in FIG. 27. Apertures 224, which output hot lubricating fluid, are shown in phantom in FIG. 22. FIG. 27 more clearly depicts output apertures 224.

FIGS. 1 through 4, FIGS. 6 through 10, and FIGS. 22 through 29 for both journal and thrust embodiments depict a lubrication device that may be used in the present invention. The lubrication device depicted in these Figures has several functions: (1) it provides a means for supplying cool, lubricating fluid to the leading end of the tilt pad to which it is attached; (2) it directs the flow of hot lubricating fluid toward the outlet apertures; and (3) it wipes hot carryover lubricating fluid from the surface of the rotating shaft. Each of these features will be discussed below.

The amount of lubricating fluid provided to each of lubrication devices 242 may be individually controlled for optional performance. Such individual control is particularly desirable when the loads on the tilting pads are unevenly distributed, as in journal bearings for horizontal shafts. The individual control also reduces the amount of lubricating fluid required in the bearing.

Figure 23:
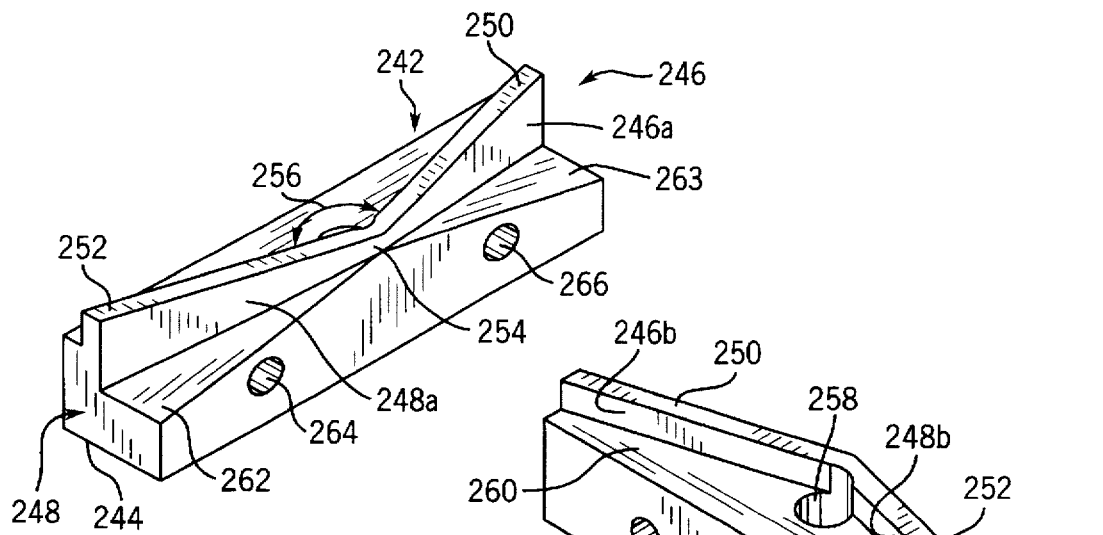
FIG. 23 is a front perspective view of a lubrication device according to the journal bearing embodiment of the present invention.
Figure 24:
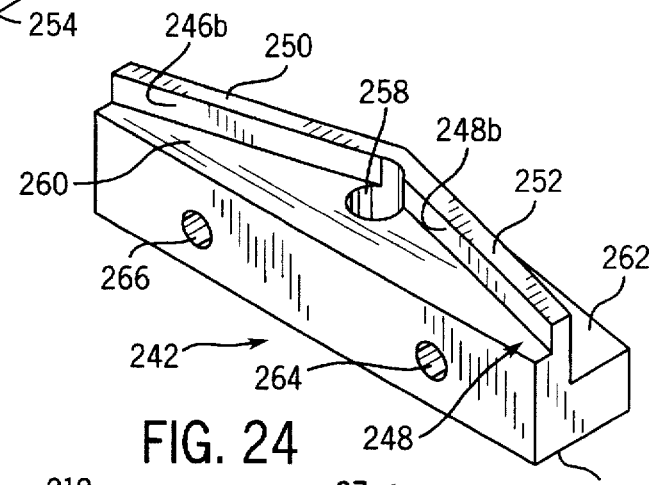
FIG. 24 is a rear perspective view of the lubrication device of FIG. 23.

FIGS. 23 and 24 are perspective views of the unique lubrication device according to the journal bearing embodiment. In FIGS. 23 and 24, lubrication device 242 includes a base 244 and two ridges 246 and 248. Each of ridges 246 and 248 extends slightly above the working surface 232 of tilt pads 226. Also, ridge 246 has a substantially radial upper surface 250, and ridge 248 has a substantially radial upper surface 252. Surfaces 246a and 248a act as lubricant directors for removal of hot lubricating fluid. Surfaces 250 and 252 act as wipers for wiping hot carryover lubricating fluid from the surface of rotating shaft 214 (FIG. 21).

Figure 25:
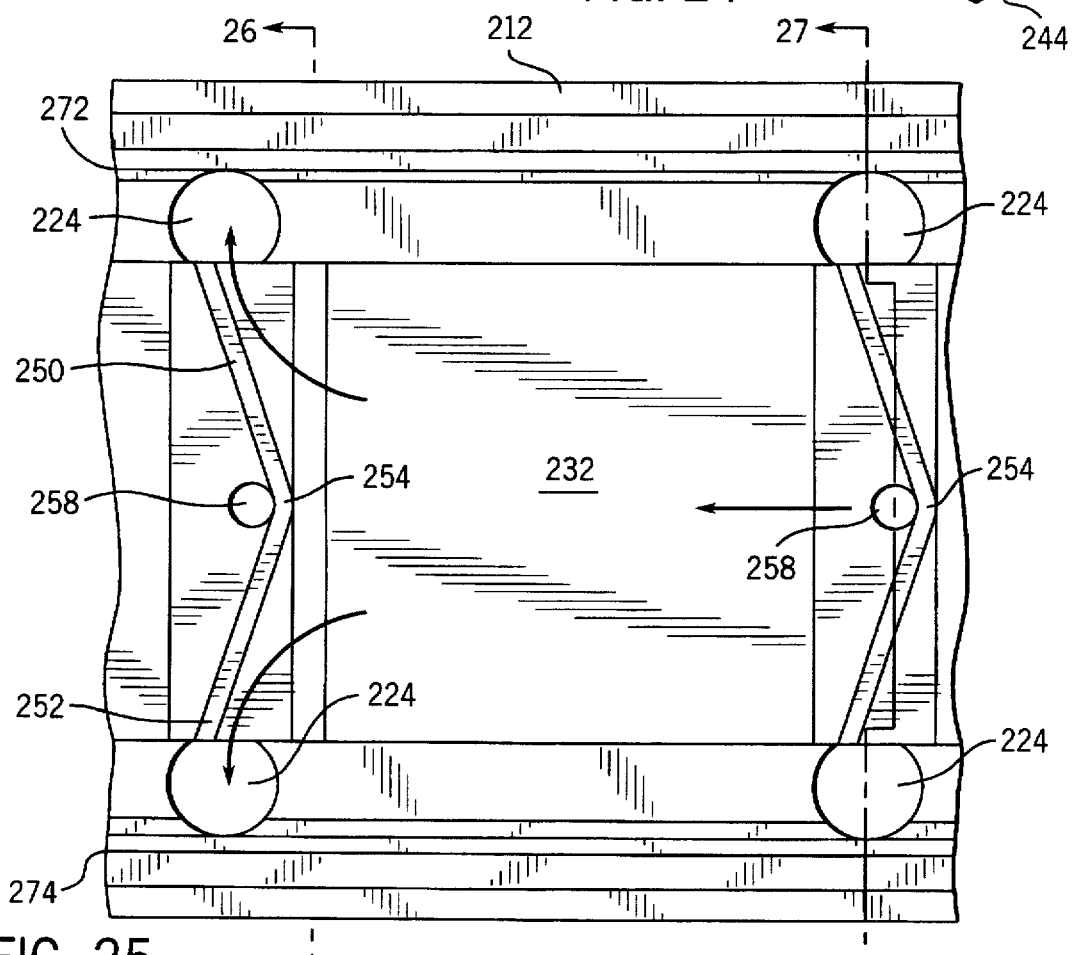
FIG. 25 is a plan view of a tilt pad-lubrication device assembly according to the journal bearing embodiment, taken along line 25—25 of FIG. 22.

Ridges 250 and 252 are disposed adjacent to each other, and indeed are connected at a junction 254. Ridges 250 and 252 form an included angle 256 on the downstream side of the ridges that is less than 180°, and is preferably between 120° to 160°. Thus, ridges 246 and 248 have a herringbone configuration. The upstream sides 246a and 248a of ridges 246 and 248 respectively direct the lubricating fluid toward outlet apertures 224, as best shown in FIGS. 25 and 27. The herringbone configuration of the ridges results in the uniform removal of lubricating fluid to both sides of lubrication device 242 and to apertures outlet 224, so that the lubrication devices with attached tilting pad may be used for either direction of shaft rotation since they are symmetrical.

As best shown in FIG. 24, ridges 246 and 248 have downstream sides 246b and 248b respectively. Ridge sides 246b and 248b direct the cool, lubricating fluid that is received by input aperture 258 of the lubrication device. The cool lubricating fluid proceeds out of aperture 258, onto base surface 260 and along sides 246b and 248b onto the related tilt pad working surface 232.

Threaded plug 252a (FIG. 27) is received in input aperture 218, and directs and meters the flow of cool lubricating fluid into aperture 258. Surface 260 is slightly lower when compared to the tilt pad working surface to facilitate distribution of the cool lubricating fluid onto the pad working surface, as best shown in FIG. 29. Also, upstream base surface 262 may be somewhat lower than the working surface on the trailing end of the upstream tilt pad to facilitate the flow of the hot lubricating fluid onto surface 262 and along ridge sides 246a and 248b toward outlet apertures 224.

Figure 26:
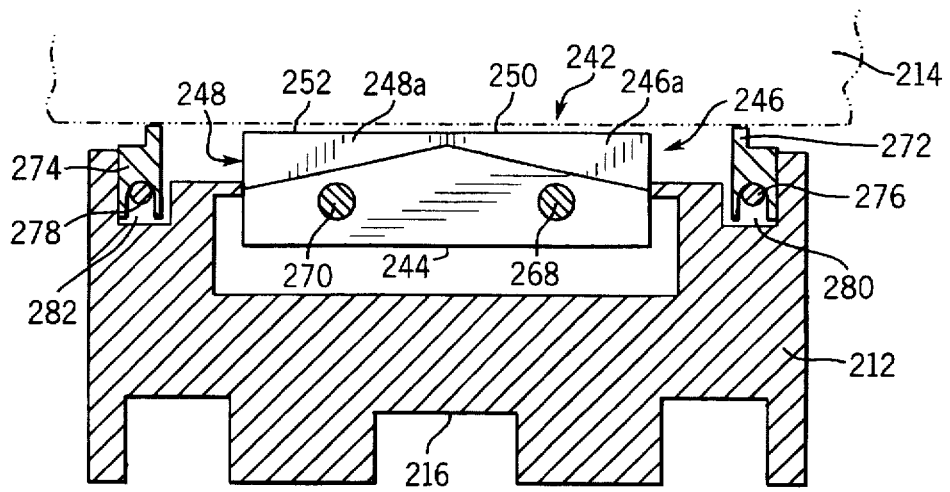
FIG. 26 is an end cross sectional view of the bearing assembly, taken along line 26—26 of FIG. 25.

As best shown in FIGS. 23, 24 and 26, lubrication device 242 includes two spaced apertures 264 and 266 that allow lubrication device 242 to be affixed to a leading surface of each of the tilt pads. Apertures 264 and 266 may receive roll pins or fasteners 268 and 270 respectively, as depicted in FIG. 26.

As an alternative to being rigidly attached to a tilt pad, lubrication device 242 could be spring-loaded by providing springs between bottom surface 244 of lubrication device 242 and surface 212a of retainer 212.

Moreover, surfaces 262 and 263 are angled downward toward outlet apertures 224 to further aid in the flow of the hot lubricating fluid.

To prevent the lubricating fluid from escaping the bearing axially, two seals 272 and 274 may be provided. Seals 272 and 274 are best shown in FIGS. 25 through 27. As best shown in FIGS. 26 and 27, seals 272 and 274 are of the free-floating type, and are retained in position around shaft 214 by respective springs 276 and 278. Seals 272 and 274 are received in respective grooves 280 and 282.

Figure 28:
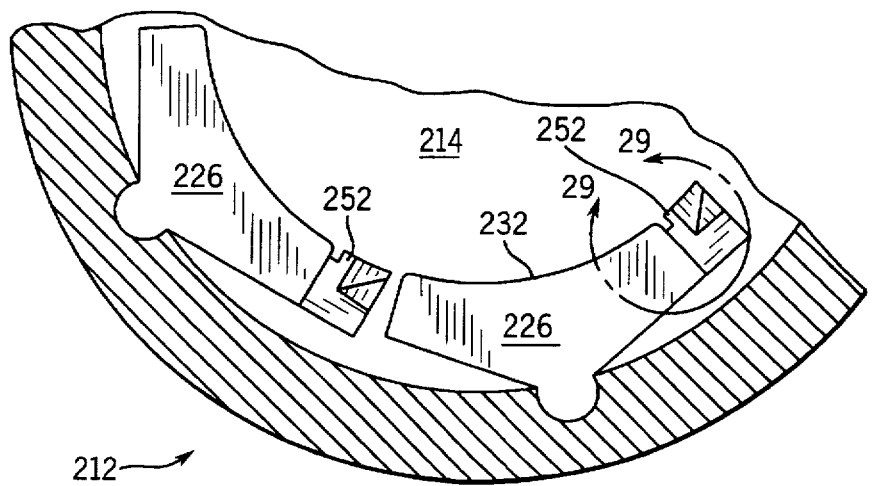
FIG. 28 is an exploded view of the bearing assembly of FIG. 21.

FIGS. 28 and 29 depict another important feature of the present invention that is used to increase the amount of hot lubricating fluid that is wiped from the surface of the rotating shaft. As shown in FIGS. 28 and 29, surface 252 of ridge 248, and surface 250 of ridge 246 (FIG. 23) are closer to rotating shaft 214 than working surface 232.

There are several ways to insure that the wiping surfaces of the lubrication device are closer to the rotating shaft or collar than the pad working surfaces at machine operating temperatures. One way is to simply position surfaces 54, 252 and 250 so that they are closer to the rotating shaft or collar. Another way, discussed above, is to spring-load or pressure-load the lubrication device so that surfaces 54, 250 and 252 are biased against the rotating shaft or collar. A third way is to use a material for the lubrication device that has a higher coefficient of thermal expansion than the material used for the tilting pads. As a result, the lubrication device will tend to expand in the direction of the rotating shaft or collar to a greater degree than the tilting pads, thereby decreasing the distance between the rotating shaft or collar and the lubrication devices. In a preferred embodiment, the lubrication device for each embodiment of the invention is manufactured from bronze or solid babbitt metal, whereas the tilting pads are typically made from steel, having a working surface only made out of babbitt metal. The lubrication device may also be made from steel or other tribological materials. The tilting pads may be made from steel or copper with a babbitt working surface, or from bronze, aluminum, zinc, silver or other tribological materials.

The unique lubrication device according to the thrust and journal embodiments of the present invention has a number of features and advantages, other than those discussed above, over prior art bearings. These features and advantages include the following:

1. The bearing according to the present invention has higher loading capability due to its improved cooling and lower pad temperatures.

2. Since the lubricating fluid is used much more efficiently when compared to prior art devices, the required lubricating fluid flow may be reduced up to 50 percent.

3. The maximum temperature of the loaded tilt pads is reduced by about 10 to 30 percent, while the bulk temperature of the lubricating fluid output is increased due to the same heat being absorbed by a smaller volume of lubricant.

4. The horsepower losses resulting from the bearing are substantially reduced.

5. The journal bearing lubricating fluid input and output passageways may be individually sized for optimum cooling, lubrication and load capacity, which is particularly important since the loads are unevenly distributed. The input and output passageways are equally sized in the thrust embodiment.

6. The hot carryover fluid is more effectively evacuated from the bearing and machine housing, with reduced churning, stirring and flow-through losses.

7. The herringbone design of the lubrication device of the journal embodiment and the radial design of the thrust embodiment wipe hot carryover fluid and direct its flow into strategically placed output apertures or channels respectively, thereby minimizing hot fluid carryover.

8. The lubrication device disperses cool lubricating fluid evenly across the working surface of its associated tilt pad, due to the placement of the input aperture, the pocket feed cavity design (thrust embodiment) and the herringbone configuration (journal embodiment). Since the bearing is non-flooded, it may be used with or without seals.

9. Since the amount of lubricating fluid is reduced, the oil pressure required to provide cool lubricating fluid is only a standard pressure, preferably 15 pounds per square inch for the journal embodiment and 5 to 15 pounds per square inch for the thrust embodiment.

10. The lubrication device may be spring or pressure loaded to increase the wiping of hot carryover fluid. These configurations both direct and channel hot lubricating fluid to the outlets, and direct cool lubricating fluid to the pad working surface.

11. The lubrication device-pad assembly of the journal embodiment may be reversed for either direction of shaft rotation since it is symmetrical.

12. The lubrication device may be made from readily available materials, such as bronze or babbitt.

We claim:

1. A lubrication device that directs the flow of a lubricating fluid in a journal bearing that has a plurality of tilting pads, comprising:
    a base;
    a first ridge that extends from said base;
    a second ridge, adjacent to said first ridge, that also extends from said base, said second ridge forming an included angle with said first ridge that is less than 180 degrees.

2. The lubrication device of claim 1, wherein said lubrication device further comprises:
    an aperture, disposed in said base in a downstream direction from said first and second ridges, that receives said lubricating fluid.

3. The lubrication device of claim 1, wherein said first and second ridges and said base are made from a material in the group consisting of bronze or babbitt metal.

4. The lubrication device of claim 1, wherein said first and second ridges extend above said base 0.06 to 0.120 inches.

5. The lubrication device of claim 1, further comprising: means for attaching said base to a tilting pad.

6. The lubrication device of claim 5, wherein said attachment means includes at least two apertures in said base that receive fasteners.

7. The lubrication device of claim 1, wherein each of said ridges has a wiper that wipes lubricating fluid from said shaft.

8. The lubrication device of claim 7, wherein each of said wipers includes a substantially radial surface.

9. The lubrication device of claim 1, wherein each of said ridges is disposed substantially transverse to the flow of lubricating fluid.

10. The lubrication device of claim 1, wherein said included angle is between 120 to 180 degrees.

11. A tilting pad bearing for a rotatable surface, comprising:
    a plurality of circumferentially-arranged tilting pads, each of said tilting pads including
        a working surface;
        a leading surface;
        a trailing surface;
    means for supporting said tilting pads;
    a detachable lubrication device disposed near at least some of said pad leading surfaces, that provides a cool lubricating fluid to said pad working surfaces; and
    a lubricant director surface, associated with at least some of said tilting pads and disposed to move hot lubricating fluid toward an outlet for said hot lubricating fluid.

12. The tilting pad bearing of claim 11, further comprising:
    a wiper surface, associated with at least one of said pads, that wipes hot lubricating fluid from said rotatable surface.

13. The tilting pad bearing of claim 11, wherein said lubrication devices are fastened near the leading surfaces of their respective pads.

14. The tilting pad bearing of claim 13, wherein said lubrication devices are detachable from their respective pads.

15. The tilting pad bearing of claim 11, wherein said lubrication devices are made from a material having a larger coefficient of thermal expansion than the material from which said tilting pads are made.

16. The tilting pad bearing of claim 11, wherein said lubrication devices are made from at least one material selected from the group consisting of babbitt, bronze, or steel.

17. A tilting pad bearing for use in connection with a rotatable surface, comprising:
    a plurality of circumferentially-arranged tilting pads, each of said tilting pads having a working surface, a leading surface and a trailing surface;
    means for supporting said tilting pads; and
    a detachable lubrication device, interconnected near at least some of said leading surfaces, for supplying a lubricating fluid to at least some of said working surfaces, said detachable lubrication device including an inlet aperture that receives lubricating fluid.

18. A tilting pad bearing for use in connection with a rotatable surface, comprising:
    a plurality of circumferentially-arranged tilting pads, each of said tilting pads having a working surface, a leading surface and a trailing surface;
    means for supporting said tilting pads;
    a detachable lubrication device, interconnected near at least some of said leading surfaces, for supplying a lubricating fluid to at least some of said working surfaces; and
    force application means for applying a force to said detachable lubrication device.

19. The tilting pad bearing of claim 18, wherein said force application means includes a spring.

20. A tilting pad bearing for use in connection with a rotatable surface, comprising:

a plurality of circumferentially-arranged tilting pads, each of said tilting pads having a working surface, a leading surface and a trailing surface;

means for supporting said tilting pads;

a detachable lubrication device, interconnected near at least some of said leading surfaces, for supplying a lubricating fluid to at least some of said working surfaces; and wiper means for wiping lubricating fluid from said rotatable surface.

21. The tilting pad bearing of claim 20, wherein said wiper means comprises:

at least one ridge interconnected with said detachable lubrication device.

22. The tilting pad bearing of claim 21, wherein said at least one ridge comprises:

a first ridge; and a second ridge adjacent to said first ridge and disposed at an included angle of less than 180 degrees to said first ridge.

23. The tilting pad bearing of claim 22, wherein said included angle is between 120 to 160 degrees.

24. The tilting pad bearing of claim 23, wherein said first and second ridges meet at a junction, and wherein said detachable lubrication device includes:

an aperture disposed adjacent to said junction.

25. A tilting pad bearing for use in connection with a rotatable surface, comprising:

a plurality of circumferentially-arranged tilting pads, each of said tilting pads having a working surface, a leading surface and a trailing surface;

means for supporting said tilting pads; and a detachable lubrication device, interconnected near at least some of said leading surfaces, for supplying a lubricating fluid to at least some of said working surfaces, wherein said detachable lubrication device is made from a material having a larger coefficient of thermal expansion than the material from which said tilting pads are made.

26. The tilting pad bearing of claim 25, wherein said tilting pads are made from a material selected from the group consisting of steel or copper with surfaces of babbitt, bronze, aluminum, zinc, or silver, and wherein said detachable lubrication device is made from a material selected from the group consisting of steel, bronze, or babbitt.

27. A tilting pad bearing for use in connection with a rotatable surface, comprising:

a plurality of circumferentially-arranged tilting pads, each of said tilting pads having a working surface, a leading surface and a trailing surface;

means for supporting said tilting pads;

a detachable lubrication device, interconnected near at least some of said leading surfaces, for supplying a lubricating fluid to at least some of said working surfaces, said lubrication device comprising a lubricant director that directs the flow of lubricating fluid, said lubricant director including:

a first ridge; and a second ridge adjacent to said first ridge and disposed at an included angle of less than 180 degrees to said first ridge.

28. The tilting pad bearing of claim 27, wherein said included angle is between 120 to 160 degrees.

29. The tilting pad bearing of claim 28, further comprising:

outlet means for receiving said lubricating fluid after said fluid has passed over at least a portion of a pad working surface.

30. The tilting pad bearing of claim 29, wherein said outlet means comprises at least one aperture disposed adjacent to said detachable lubrication device.

31. A tilting pad bearing for a rotatable surface, comprising:

a plurality of circumferentially-arranged tilting pads, each of said tilting pads having a working surface, a leading end and a trailing end;

means for supporting said tilting pads;

inlet means, disposed near at least some of said leading ends, for supplying a lubricating fluid to at least some of said working surfaces;

outlet means, disposed near at least some of the trailing ends, for receiving said lubricating fluid after said lubricating fluid has passed over at least a portion of a pad working surface;

a lubrication device, associated with at least one of said tilting pads and disposed near said outlet means, that directs said lubricating fluid toward said outlet means, said lubrication device including a first ridge; and a second ridge adjacent to said first ridge and disposed at an included angle of less than 180 degrees to said first ridge.

32. The tilting pad bearing of claim 31, wherein said first ridge and said second ridge each extend slightly above said working surface.

33. The tilting pad bearing of claim 31, wherein said first ridge and said second ridge are substantially transverse to said flow of said lubricating fluid.

34. The tilting pad bearing of claim 31, wherein each of said ridges includes a surface that wipes lubricating fluid from said shaft.

35. The tilting pad bearing of claim 34, wherein said wiper surfaces are in close proximity with said shaft at bearing operating temperatures, and closer to said shaft than said pad working surfaces.

36. The tilting pad bearing of claim 34, wherein each of said wipers includes a substantially radial surface.

37. The tilting pad bearing of claim 31, wherein said outlet means includes:

a first aperture near a first ridge end of said first ridge, said first ridge end being distal to said second ridge; and a second aperture near a second ridge end of said second ridge, said second ridge end being distal to said first ridge.

38. The tilting pad bearing of claim 37, wherein said first and second apertures are disposed in said retainer.

39. The tilting pad bearing of claim 31, wherein said included angle is between 120 to 160 degrees.

40. The tilting pad bearing of claim 31, wherein said input means includes an aperture in said lubrication device downstream of said first and second ridges.

41. The tilting pad bearing of claim 40, wherein said first ridge and said second ridge meet at a junction, and wherein said aperture is disposed near said junction.

42. The tilting pad bearing of claim 31, wherein said lubrication device is fastened near the leading end of said associated pad.

43. The tilting pad bearing of claim 42, wherein said fastened lubrication device is detachable from said associated pad.

44. The tilting pad bearing of claim 31, wherein said lubrication device is made from a material having a larger coefficient of thermal expansion than the material from which said associated tilting pad is made.

45. The tilting pad bearing of claim 44, wherein said associated tilting pad is made from a material in the group consisting of steel or copper with surfaces of babbitt, bronze, aluminum, zinc, or silver, and wherein said lubrication device is made from a material in the group consisting of bronze or babbitt.

* * * * *